(12) United States Patent
Simms, II

(10) Patent No.: US 8,381,712 B1
(45) Date of Patent: Feb. 26, 2013

(54) SIMULTANEOUS MULTIPLE COOKING MODE BARBECUE GRILL

(76) Inventor: John Lee Simms, II, Atlanta, GA (US)

(*) Notice: Subject to any disclaimer, the term of this patent is extended or adjusted under 35 U.S.C. 154(b) by 510 days.

(21) Appl. No.: 11/193,320

(22) Filed: Jul. 30, 2005

Related U.S. Application Data

(60) Provisional application No. 60/592,428, filed on Jul. 31, 2004, provisional application No. 60/592,429, filed on Jul. 31, 2004.

(51) Int. Cl.
*F24B 3/00* (2006.01)

(52) U.S. Cl. ............. 126/25 R; 126/36; 126/2; 126/3; 99/339

(58) Field of Classification Search .............. 126/2, 3, 126/36, 151, 25 R, 307 R, 220; 99/339, 374, 99/448, 292
See application file for complete search history.

(56) References Cited

U.S. PATENT DOCUMENTS

| | | | |
|---|---|---|---|
| D165,998 S | 2/1952 | Pollard | |
| 2,666,426 A | 1/1954 | Pollard | |
| 2,687,716 A | 8/1954 | Wong | |
| 2,817,331 A * | 12/1957 | Kaplan et al. ............. | 126/41 R |
| 2,902,026 A | 9/1959 | Hathorn, Jr. | |
| 2,903,549 A * | 9/1959 | Joseph .......................... | 99/400 |
| D196,553 S | 10/1963 | Mayer | |
| 3,477,580 A | 11/1969 | Willinger | |
| 3,541,947 A * | 11/1970 | Anderson ..................... | 99/332 |
| D229,660 S | 12/1973 | Gammon | |
| 3,802,413 A * | 4/1974 | Pepin ........................ | 126/25 B |
| 3,868,942 A | 3/1975 | Lewis | |
| D235,088 S | 5/1975 | Erikson | |
| 4,090,490 A | 5/1978 | Riley et al. | |
| 4,170,173 A | 10/1979 | Bradford | |
| D255,863 S | 7/1980 | Futch | |
| 4,392,419 A * | 7/1983 | Bonny ............................ | 99/339 |
| 4,665,891 A * | 5/1987 | Nemec et al. ................ | 126/25 R |
| 4,677,964 A * | 7/1987 | Lohmeyer et al. .......... | 126/41 R |
| 4,700,618 A * | 10/1987 | Cox, Jr. .......................... | 99/339 |
| 4,773,319 A * | 9/1988 | Holland ......................... | 99/446 |
| 4,809,671 A * | 3/1989 | Vallejo, Jr. .................. | 126/39 R |
| 4,878,477 A * | 11/1989 | McLane ....................... | 126/41 R |
| 4,886,045 A * | 12/1989 | Ducate et al. ............... | 126/41 R |
| 4,934,333 A * | 6/1990 | Ducate et al. .................. | 126/24 |
| 5,070,857 A | 12/1991 | Sarten | |
| 5,076,252 A * | 12/1991 | Schlosser et al. ........... | 126/25 R |
| 5,195,423 A * | 3/1993 | Beller ............................ | 99/340 |
| 5,213,027 A * | 5/1993 | Tsotsos et al. ................ | 99/339 |
| 5,460,159 A * | 10/1995 | Bussey ........................ | 126/25 R |
| 5,481,964 A * | 1/1996 | Kitten ............................ | 99/339 |
| 5,528,984 A * | 6/1996 | Saurwein ..................... | 99/482 |
| 5,566,606 A * | 10/1996 | Johnston ........................ | 99/446 |
| 5,706,797 A * | 1/1998 | Moore et al. ................ | 126/41 R |
| 5,752,497 A | 5/1998 | Combs et al. | |
| 5,768,977 A * | 6/1998 | Parris et al. .................... | 99/340 |
| 5,893,357 A * | 4/1999 | Royer et al. ................... | 126/9 R |
| 6,039,039 A * | 3/2000 | Pina, Jr. ...................... | 126/25 R |
| 6,103,289 A * | 8/2000 | Tippmann et al. ............ | 426/510 |

(Continued)

OTHER PUBLICATIONS

U.S. Appl. No. 11/194,120, filed Jul. 30, 2005, Simms, II.

(Continued)

*Primary Examiner* — Alfred Basichas
(74) *Attorney, Agent, or Firm* — Lee & Hayes, PLLC

(57) ABSTRACT

A simultaneous multiple cooking mode barbecue grill that includes a first cooking mode unit configured to prepare food in a first cooking mode, a second cooking mode unit configured to prepare food in a second cooking mode, and a supporting structure that supports the first cooking mode unit and the second cooking mode unit so that the first and second cooking mode units can be moved securely and operated simultaneously to prepare food using multiple cooking modes.

20 Claims, 3 Drawing Sheets

U.S. PATENT DOCUMENTS

| | | | | |
|---|---|---|---|---|
| 6,145,431 | A * | 11/2000 | Tippmann et al. | 99/330 |
| 6,189,528 | B1 * | 2/2001 | Oliver | 126/25 R |
| 6,209,533 | B1 * | 4/2001 | Ganard | 126/25 R |
| 6,257,130 | B1 * | 7/2001 | Schlosser | 99/482 |
| D447,913 | S | 9/2001 | Cragg | |
| 6,439,221 | B1 * | 8/2002 | Ward et al. | 126/25 R |
| 6,508,165 | B2 * | 1/2003 | Johnson | 99/339 |
| 6,523,461 | B1 * | 2/2003 | Johnston et al. | 99/340 |
| 6,557,545 | B2 * | 5/2003 | Williams | 126/25 R |
| 6,564,793 | B2 * | 5/2003 | DeClue | 126/25 AA |
| 6,606,986 | B2 * | 8/2003 | Holland et al. | 126/25 R |
| 6,626,089 | B1 * | 9/2003 | Hubert | 99/339 |
| D483,602 | S | 12/2003 | Murray | |
| 6,681,759 | B2 | 1/2004 | Bentulan | |
| D491,410 | S | 6/2004 | Saunders | |
| 6,820,538 | B2 * | 11/2004 | Roescher | 99/340 |
| 7,159,509 | B2 * | 1/2007 | Starkey | 99/339 |
| D607,263 | S | 1/2010 | Antwine | |
| D636,217 | S | 4/2011 | Slater et al. | |
| 2002/0106428 | A1 * | 8/2002 | Szyjkowski | 426/113 |
| 2003/0019492 | A1 | 1/2003 | Williams | |
| 2010/0083947 | A1 | 4/2010 | Guillory et al. | |
| 2010/0258106 | A1 | 10/2010 | Simms, II | |

OTHER PUBLICATIONS

U.S. Appl. No. 29/392,019, filed May 16, 2011, Simms, II.
U.S. Appl. No. 29/392,027, filed May 16, 2011, Simms, II.

* cited by examiner

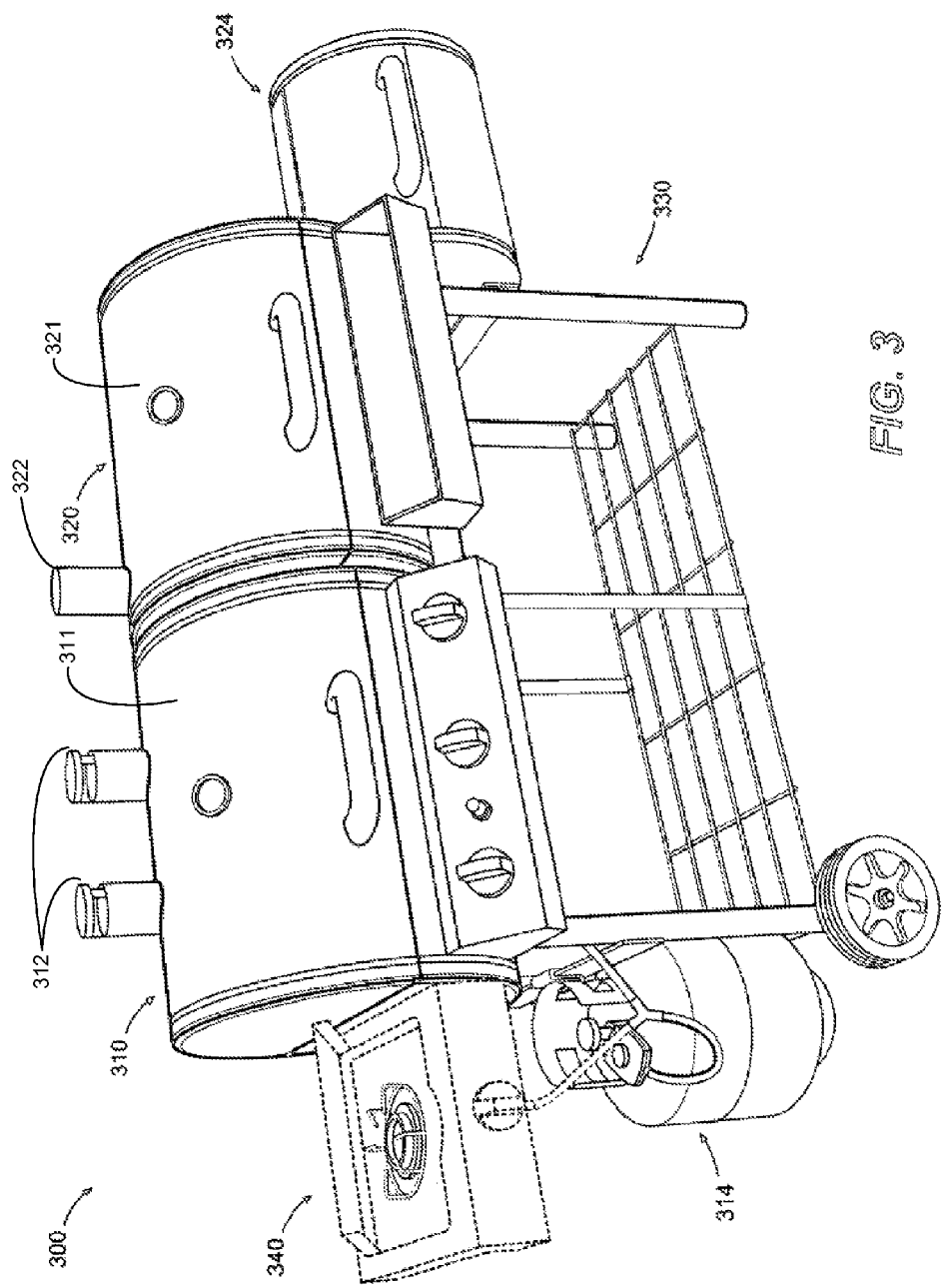

SIMULTANEOUS MULTIPLE COOKING MODE BARBECUE GRILL

CROSS REFERENCE TO RELATED APPLICATIONS

This application claims the benefit of priority to U.S. provisional patent application Ser. No. 60/592,428, entitled "Simultaneous Multiple Cooking Mode Barbecue Grill," and filed on Jul. 31, 2004, and to U.S. provisional patent application Ser. No. 60/592,429, entitled "Heating of Radiant Materials for Preparation of Barbecue," and filed on Jul. 31, 2004, both of which are incorporated by reference herein.

This application is related to U.S. nonprovisional patent application Ser. No. 11/194,120, entitled "Heating of Radiant Materials for Preparation of Barbecue," and filed concurrently with this application on Jul. 30, 2005, which is incorporated by reference herein.

TECHNICAL FIELD

The present invention generally relates to cooking equipment, and more particularly, to a simultaneous multiple cooking mode barbecue grill.

BACKGROUND OF INVENTION

Barbecue enthusiasts have the need to prepare barbecue using various modes (methods, manners, etc.) of cooking. For example, sometimes barbecuing with a charcoal based fuel (e.g., charcoal briquettes) is needed. Other times, barbecuing with a wood based fuel is needed (e.g., for a smoker process). Yet other times, barbecuing with a gas based fuel (e.g., propane) is needed. Furthermore, other types of fuel may be needed to satisfy the barbecuing objective.

Existing options typically consist of a barbecue grill that can only prepare barbecue in a single mode. For example, some options provide for charcoal grilling, others for wood or smoker grilling, and yet others for gas grilling. For the "multi-mode" barbecuer, these options require the use of more than one separate grill. A few options consist of a grill that can be converted between two modes, for example, charcoal and gas. However, these options are still limited in that they can only be operated in one mode at a time and typically require complicated reconfigurations to switch between cooking modes. Moreover, these existing options lack sufficient capability for controlling the various cooking modes in order to obtain performance that is even comparable to existing single mode grills.

Therefore, there is a need in the art for a barbecue grill that is capable of cooking in multiple modes simultaneously while offering the control and performance capabilities for each mode that is at least comparable to a corresponding single mode grill.

SUMMARY OF INVENTION

The invention, in accordance with exemplary embodiments described herein, provides a simultaneous multiple cooking mode barbecue grill. In a general embodiment, the simultaneous multiple cooking mode barbecue grill can include a first cooking mode unit configured to prepare food in a first cooking mode, a second cooking mode unit configured to prepare food in a second cooking mode, and a supporting structure that supports the first cooking mode unit and the second cooking mode unit so that the first and second cooking mode units can be moved securely and operated simultaneously to prepare food using multiple cooking modes. Exemplary embodiments of the simultaneous multiple cooking mode barbecue grill disclosed herein can provide, among other benefits, the ability to effectively and conveniently prepare barbecue by various cooking modes at the same time.

BRIEF DESCRIPTION OF DRAWINGS

FIG. 3 shows another alternate exemplary multiple mode barbecue grill in accordance with exemplary embodiments of the invention.

DETAILED DESCRIPTION OF EXEMPLARY EMBODIMENTS OF INVENTION

Figure 1:
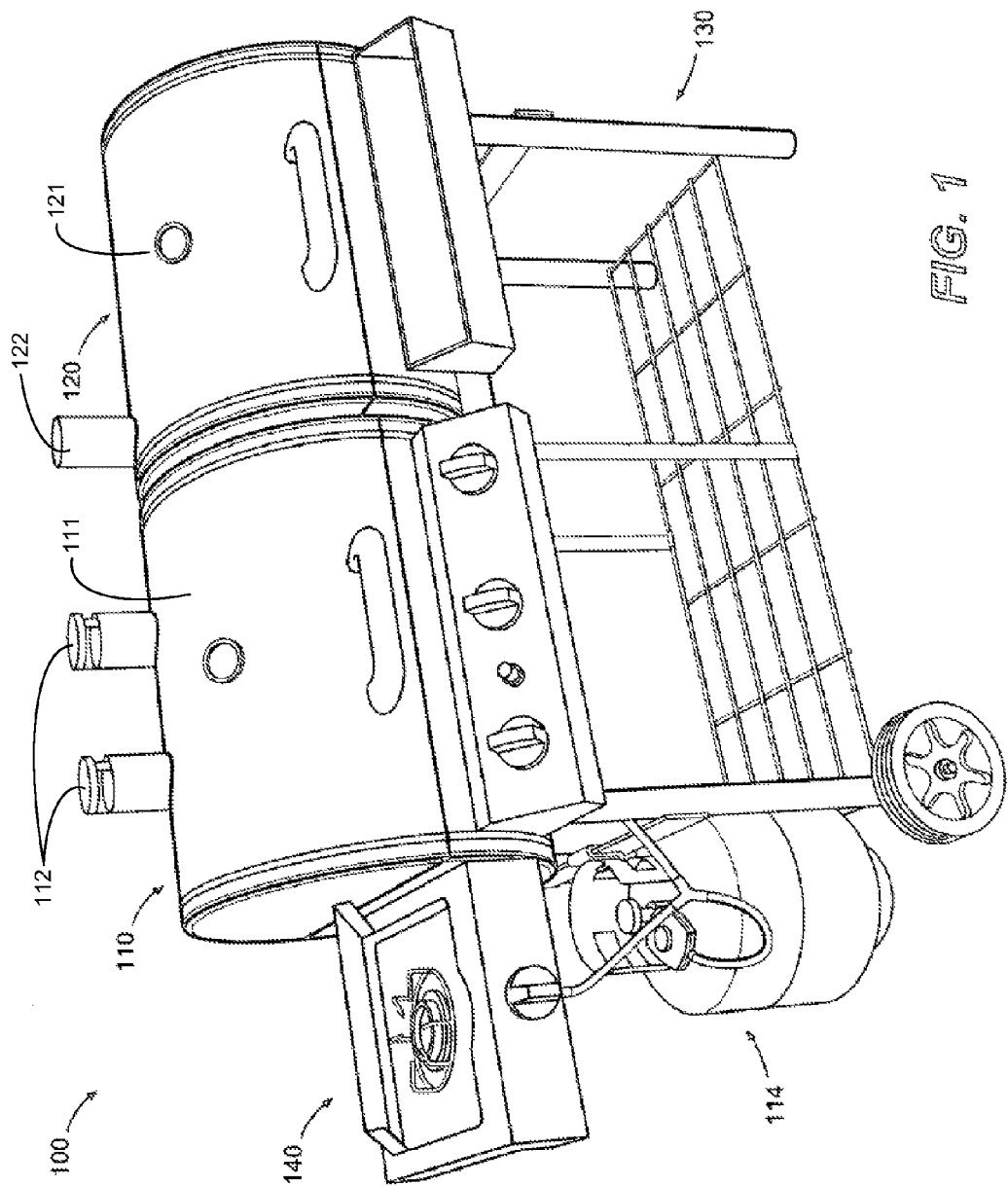
FIG. 1 shows an exemplary multiple mode barbecue grill in accordance with exemplary embodiments of the invention.

Exemplary embodiments of the invention will be described hereinafter with reference to the drawings, in which like reference numerals may represent like elements throughout the several figures. In that regard, FIG. 1 shows an exemplary multiple mode ("multi-mode") barbecue grill 100 in accordance with exemplary embodiments of the invention. The grill 100 includes a first cooking mode unit 110 and a second cooking mode unit 120. The first cooking mode unit 110 may, for example, operate using a gas based fuel such as propane. This gas based fuel may be supplied from a fuel container 114 that is connected to the first unit 110. The first cooking mode unit 110 may include an openable cover 111 with exhausts 112. The second cooking mode unit 120 may, for example, operate using a charcoal based fuel such as charcoal briquettes, chunks, fragments, etc. The second cooking mode unit 120 may include an openable cover 121 with exhaust 122. The first unit 110 and second unit 120 are typically supported by a common supporting structure (assembly, platform, base, frame, etc.) 130.

Additional components of the grill 100, such as the fuel container 114, can also be supported by the supporting structure 130 so that the components of the grill 100 can be moved (positioned, placed, etc.) securely (e.g., without shifting, slippage, disturbance, etc.) and operated together simultaneously. In this regard, the first unit 110 and second unit 120 (as well as other components of the grill 100) may be attached, connected, or otherwise secured to the supporting structure 130 by means, methods, apparatuses, etc. that may be known in the art and/or apparent to one of ordinary skill in the art based on the disclosure herein. Moreover, the multi-mode grill 100 may include additional cooking mode units in accordance with some exemplary embodiments of the invention. For example, the multi-mode grill 100 may also include a third cooking mode unit 140, which can provide another mode for cooking with the grill 100. For instance, the third cooking mode unit 140 may be an auxiliary or side burner unit that can provide a radiant heat cooking mode by, for example, radiating heat, flames, etc. at one or more of its surfaces (e.g., via a burner component, structure, assembly, etc.) by the burning (combustion, etc.) of a gas based fuel such as propane. In that regard, the third cooking mode unit 140 may also be connected to the fuel container 114 for a fuel supply. However, the third cooking mode unit 140 may operate using other types of fuel (energy, materials, etc.) as well.

Figure 2:
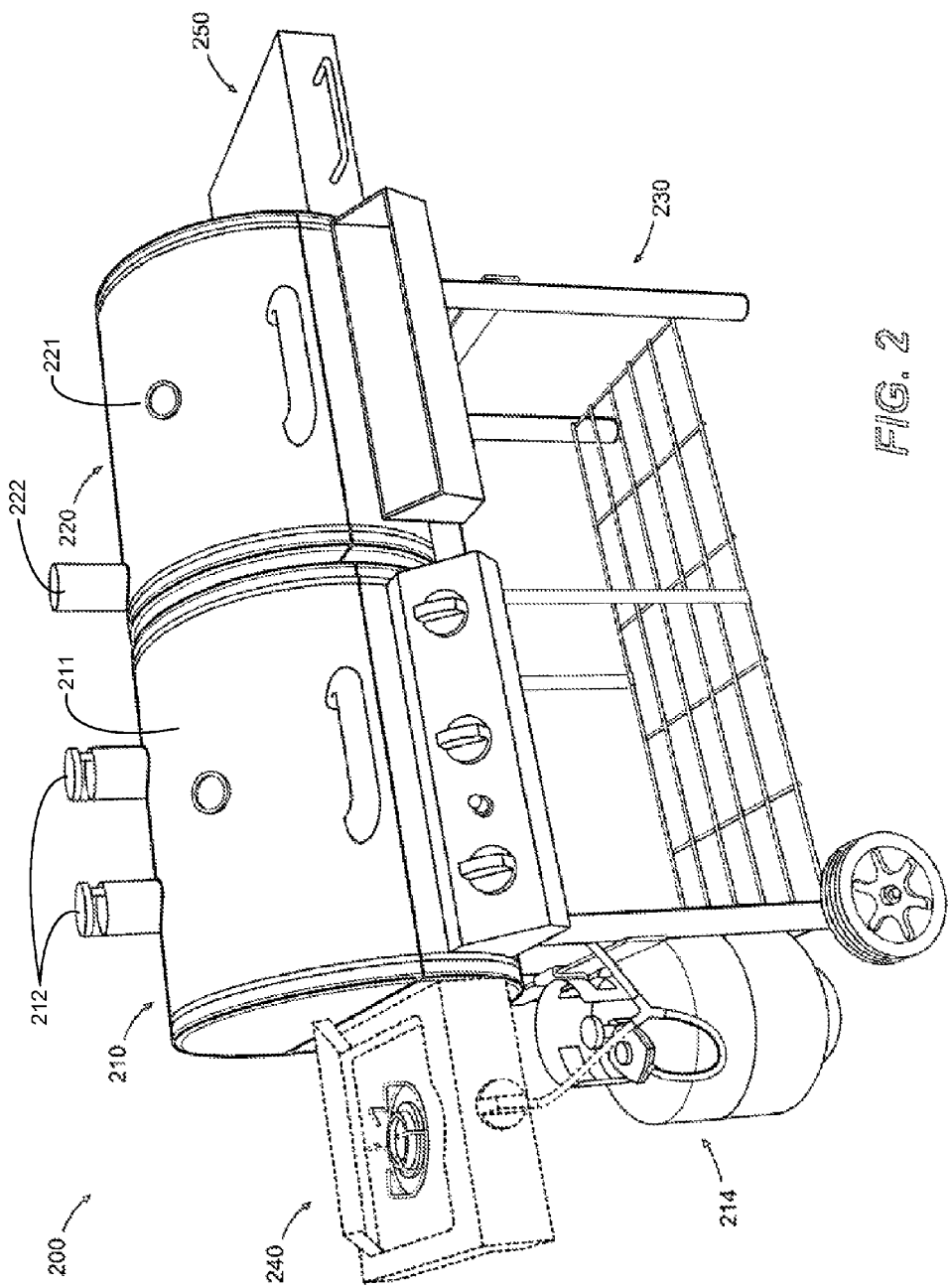
FIG. 2 shows an alternate exemplary multiple mode barbecue grill in accordance with exemplary embodiments of the invention.

FIG. 2 shows an alternate exemplary multiple mode barbecue grill 200 in accordance with exemplary embodiments of the invention. In that regard, the grill 200 includes some of the same (or similar) features as the grill 100 discussed above. For example, the grill 200 includes a first cooking mode unit 210 and a second cooking mode unit 220. The first cooking mode unit 210 may include an openable cover 211 with exhausts 212, and the second cooking mode unit 220 may include an openable cover 221 with exhaust 222. Furthermore, the grill 200 includes a common supporting structure (assembly, platform, base, frame, etc.) 230 that can support the cooking mode units 210, 220 as well as additional components, such as a fuel container 214, all which may be attached, connected, or otherwise secured to the structure 230 by means, methods, apparatuses, etc. that may be known in the art and/or apparent to one of ordinary skill in the art based on the disclosure herein. Moreover, the grill 200 may include additional cooking mode units such as a third cooking mode (e.g., a side burner) unit 240. Additionally, in accordance with some exemplary embodiments of the invention, the grill 200 may include a supporting surface (shelf, platform, etc.) 250 (e.g., as depicted in FIG. 2), which can be used for various purposes such as to support food, cooking utensils, etc. that may be used along with the grill 200.

FIG. 3 shows another alternate exemplary multiple mode barbecue grill 300 in accordance with exemplary embodiments of the invention. Similar to the foregoing grill 200, the grill 300 also includes some of the same (or similar) features as the grill 100, which was discussed above. For example, the grill 300 includes a first cooking mode unit 310 and a second cooking mode unit 320 supported on a common supporting structure (assembly, platform, base, frame, etc.) 330, which can also support additional components such as a fuel container 314, and these components may be attached, connected, or otherwise secured to the structure 330 by means, methods, apparatuses, etc. that may be known in the art and/or apparent to one of ordinary skill in the art based on the disclosure herein. The first cooking mode unit 310 may include an openable cover 311 with exhausts 312, and the second cooking mode unit 320 may include an openable cover 321 with exhaust 322. Furthermore, the grill 300 may include a third cooking mode (e.g., a side burner) unit 340. Additionally, in accordance with some exemplary embodiments of the invention, the grill 300 can include a fourth cooking mode unit 324. This unit 324 may operate separately to prepare food in another cooking mode or may operate in conjunction with the second cooking unit 320. For example, the second cooking unit 320 may operate in a smoker cooking mode (e.g., wood burning), wherein the fourth unit 324 may operate as a firebox (offset firebox, side firebox, smoker box, etc.) in which fuel materials can be burned or combusted to provide heat and/or smoke to the second cooking unit 320 through an interconnection of the two units 320, 324 to prepare smoked barbecue. Furthermore, the fourth cooking mode unit may operate in other cooking modes, such as a separate barbecue or smoker grill unit for example.

The exemplary multiple mode barbecue grills 100, 200, 300 described herein can be used to barbecue or otherwise prepare food (e.g., heat, cook, grill, char, smoke, etc.) by multiple (e.g., at least two) cooking modes (e.g., gas, charcoal, wood burning, electrical, etc.) simultaneously (concurrently, together, at the same time, etc.) on a single overall supporting structure (assembly, platform, base, frame, etc.) 130, 230, 330. Furthermore, each cooking mode provided by the multi-mode grills 100, 200, 300 may be fully and independently controlled (e.g., by means, methods, apparatuses, etc. that may be known in the art and/or apparent to one of ordinary skill in the art based on the disclosure herein) to obtain optimal performance for each cooking mode that is at least comparable to the operation of corresponding single cooking mode grills. Moreover, operation in the various cooking modes provided by the grills 100, 200, 300 can be conducted without the need for complicated reconfigurations of the cooking units 110, 120, 140, 210, 220, 240, 310, 320, 324, 340. Thus, the multiple mode barbecue grills 100, 200, 300 offer a barbecue cook, enthusiast, etc. the ability to, among other things, effectively and conveniently prepare barbecue by various cooking modes at the same time. These and other such uses of exemplary embodiments of the invention will be apparent to one of ordinary skill in the art in light of the disclosure herein.

The exemplary multiple mode barbecue grills 100, 200, 300 described herein and/or various components thereof (e.g., the cooking units 110, 120, 140, 210, 220, 240, 310, 320, 324, 340 or supporting structure 130, 230, 330) can have various shapes, sizes, and configurations (e.g., other than those discussed above) within the scope of exemplary embodiments of the invention. Furthermore, the functions of such components are not limited to those described above with respect to the exemplary embodiments. Various combinations of number, types, configurations, etc. of cooking mode units can be included in the grills 100, 200, 300 in accordance with exemplary embodiments of the invention. Moreover, one or more of the various cooking units 110, 120, 140, 210, 220, 240, 310, 320, 324, 340 may include one or more features similar to those of a corresponding cooking unit of a single mode grill. Such features and variations of exemplary embodiments of the invention will be apparent to one of ordinary skill in the art in light of the disclosure herein.

The exemplary multiple mode barbecue grills 100, 200, 300 described herein and/or various components thereof (e.g., the cooking units 110, 120, 140, 210, 220, 240, 310, 320, 324, 340 or supporting structure 130, 230, 330) can be constructed of various materials that may be known in the art and/or apparent to one of ordinary skill in the art based on the disclosure herein, such as but not limited to metallic materials, non-metallic materials, composite materials, etc. Furthermore, the grills 100, 200, 300 and/or various components thereof can be manufactured according to various methods, processes, etc. that may be known in the art and/or apparent to one of ordinary skill in the art based on the disclosure herein, such as but not limited to manual manufacturing methods, automated manufacturing methods, assembly line processes, metallurgical processes, chemical processes, etc.

It should be understood that the foregoing descriptions merely relate to exemplary, illustrative embodiments of the invention. Therefore, it should also be understood that other various modifications may be made to exemplary embodiments described herein within the scope of the invention, which will be recognized by one of ordinary skill in the art in light of the disclosure herein.

What is claimed is:

1. A barbecue grill having multiple cooking units, comprising:
   a support structure configured to support a plurality of cooking units;
   a first cooking unit configured to cook food using gas cooking fuel, the first cooking unit attached to the support structure and including at least one first grill, the first cooking unit further including an openable first cover attached to the first cooking unit that selectively covers the first grill, wherein the first cover includes at least one exhaust; and
   a second cooking unit configured to cook food using solid cooking fuel, the second cooking unit attached to the support structure and including at least one second grill, the second cooking unit further including an openable second cover attached to the second cooking unit that selectively covers the second grill, wherein the second cover includes at least one exhaust, wherein the first cooking unit and the second cooking unit are simultaneously operable to cook food and the first grill and second grill are selectively and independently coverable.

2. The barbeque grill of claim 1, further comprising:
a side burner supported by the supporting structure and comprising a component configured to prepare food by radiating heat or emitting flames;
wherein the side burner, the first cooking unit, and the second cooking unit are simultaneously operable to cook food.

3. The barbeque grill of claim 2, further comprising:
a firebox supported by the supporting structure and configured to provide heat or smoke to the second cooking unit when a fuel material is burned or combusted in the firebox;
wherein the firebox simultaneously operable with the side burner, the first cooking unit, and the second cooking unit.

4. The barbeque grill of claim 1, wherein the first cooking unit and the second cooking unit are operable independently of each other.

5. The barbeque grill of claim 1, further comprising:
at least one substantially vertical panel positioned between the first cooking unit and the second cooking unit.

6. The barbeque grill of claim 1, wherein the support structure comprises at least two wheels.

7. The barbeque grill of claim 1, wherein the support structure is configured to hold at least one fuel container.

8. The barbeque grill of claim 1, wherein the first and second cooking units are each configured to hold food over a flame.

9. The barbecue grill of claim 1, wherein the configuration of the at least one exhaust of the first cover includes a configuration of at least two exhausts.

10. A barbecue grill having multiple means for cooking, comprising:
a first means for cooking food using gas cooking fuel, the first means for cooking including at least one first grill and an openable first cover means for selectively covering the first grill, wherein the first cover means is attached to the first means for cooking and includes at least one exhaust;
a second means for cooking food using solid cooking fuel, the second means for cooking including at least one second grill and an openable second cover means for selectively covering the second grill, wherein the second cover means is attached to the second means for cooking and includes at least one exhaust means; and
a structure means for supporting the first means for cooking and the second means for cooking;
wherein the first means for cooking and the second means for cooking are simultaneously operable to cook food and the first grill and second grill are selectively and independently coverable.

11. The barbeque grill of claim 10, further comprising:
a burner means for preparing food by radiating heat or emitting flames, the burner means supported by the structure means;
wherein the burner means, the first means for cooking, and the second means for cooking are simultaneously operable to cook food.

12. The barbeque grill of claim 11, further comprising:
a firebox means for providing heat or smoke to the second means for cooking, the firebox means supported by the structure means;
wherein the firebox means is simultaneously operable with the burner means, the first means for cooking, and the second means for cooking.

13. The barbeque grill of claim 10, wherein the first means for cooking and the second means for cooking are operable independently of each other.

14. The barbeque grill of claim 10, further comprising:
at least one substantially vertical panel positioned between the first means for cooking and the second means for cooking.

15. The barbeque grill of claim 10, wherein the structure means comprises a means for holding at least one fuel container.

16. The barbeque grill of claim 10, wherein the configuration of the at least one exhaust means of the first cover means includes a configuration of at least two exhaust means.

17. A barbecue grill having multiple cooking units, comprising:
a support structure configured to support a plurality of cooking units;
a first cooking unit supported by the support structure, the first cooking unit having a substantially cylindrical shape, the first cooking unit configured to cook food using gas cooking fuel, the first cooking unit including at least one first grill and an openable first cover attached to the first cooking unit that selectively covers the first grill, wherein the first cover includes at least one exhaust; and
a second cooking unit supported by the support structure, the second cooking unit having a substantially cylindrical shape, the second cooking unit configured to cook food using solid cooking fuel, the second cooking unit including at least one second grill and an openable second cover attached to the second cooking unit that selectively covers the second grill, wherein the second cover includes at least one exhaust,
wherein the first cooking unit and the second cooking unit are simultaneously operable to cook food and the first grill and second grill are selectively and independently coverable.

18. The barbeque grill of claim 17, wherein the first and second cooking units are supported by the support structure such that the substantially cylindrical shape of the first cooking unit and the substantially cylindrical shape of the second cooking unit are aligned substantially coaxially.

19. The barbeque grill of claim 18, wherein the first cover forms a portion of the substantially cylindrical shape of the first cooking unit, and wherein the second cover forms a portion of the substantially cylindrical shape of the second cooking unit.

20. The barbecue grill of claim 17, wherein the configuration of the at least one exhaust of the first cover includes a configuration of at least two exhausts.

* * * * *

UNITED STATES PATENT AND TRADEMARK OFFICE
CERTIFICATE OF CORRECTION

| | | |
|---|---|---|
| PATENT NO. | : 8,381,712 B1 | Page 1 of 1 |
| APPLICATION NO. | : 11/193320 | |
| DATED | : February 26, 2013 | |
| INVENTOR(S) | : Simms | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 642 days.

Signed and Sealed this
Twenty-seventh Day of January, 2015

Michelle K. Lee
*Deputy Director of the United States Patent and Trademark Office*